US011890548B1

(12) United States Patent
Walker et al.

(10) Patent No.: US 11,890,548 B1
(45) Date of Patent: Feb. 6, 2024

(54) CROWD-SOURCED ESPORTS STREAM PRODUCTION

(71) Applicants: SONY INTERACTIVE ENTERTAINMENT LLC, San Mateo, CA (US); SONY INTERACTIVE ENTERTAINMENT INC., Tokyo (JP)

(72) Inventors: Victoria Walker, San Mateo, CA (US); Morgan Fryer-McCulloch, San Mateo, CA (US); Brielle Powell, San Mateo, CA (US); Olga Rudi, San Mateo, CA (US); Steven Osman, San Mateo, CA (US); Angela Bartolome, San Mateo, CA (US); Charles McCoy, San Mateo, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 3 days.

(21) Appl. No.: 17/870,652

(22) Filed: Jul. 21, 2022

(51) Int. Cl.
*A63F 13/86* (2014.01)
*A63F 13/355* (2014.01)
*A63F 13/79* (2014.01)

(52) U.S. Cl.
CPC .......... *A63F 13/86* (2014.09); *A63F 13/355* (2014.09); *A63F 13/79* (2014.09); *A63F 2300/535* (2013.01); *A63F 2300/538* (2013.01); *A63F 2300/5546* (2013.01); *A63F 2300/577* (2013.01)

(58) Field of Classification Search
None
See application file for complete search history.

(56) References Cited

U.S. PATENT DOCUMENTS

| 2007/0188501 A1* | 8/2007 | Yee ........................ G06T 15/20 345/473 |
| 2014/0094302 A1* | 4/2014 | Wilkiewicz ........... A63F 13/355 463/31 |
| 2017/0157512 A1 | 6/2017 | Long et al. |

(Continued)

FOREIGN PATENT DOCUMENTS

WO  WO 2017/004433  1/2017

OTHER PUBLICATIONS

SCEA-22076PCT PCT Application No. PCT/US23/24039, International Search Report dated Aug. 30, 2023.

(Continued)

*Primary Examiner* — Jason T Yen
(74) *Attorney, Agent, or Firm* — Polsinelli LLP

(57) ABSTRACT

The present technology provides solutions for crowd-sourcing stream productions for a virtual esports environment. A method can include generating a virtual environment associated with an interactive session that includes a plurality of spectator devices, wherein each of the spectator devices is presented with a different display based on a corresponding vantage point located within the virtual environment; receiving a plurality of media captures from the spectator devices, wherein each of the media captures is captured from the corresponding vantage point of the spectator device within the virtual environment; selecting one of the media captures based on a comparison of visibility of an asset in the virtual environment; and streaming the selected media capture to a primary display on a requesting device.

19 Claims, 4 Drawing Sheets

(56) References Cited

U.S. PATENT DOCUMENTS

| | | |
|---|---|---|
| 2017/0269685 A1* | 9/2017 | Marks ................... A63F 13/533 |
| 2019/0118086 A1* | 4/2019 | Gentile ................... A63F 13/25 |
| 2021/0023447 A1 | 1/2021 | Gentile et al. |
| 2022/0088493 A1 | 3/2022 | Gibbon et al. |
| 2022/0191348 A1 | 6/2022 | Sarkar |
| 2022/0203234 A1 | 6/2022 | Olabode et al. |
| 2022/0219090 A1 | 7/2022 | Smith et al. |
| 2022/0219091 A1 | 7/2022 | Kumah et al. |

OTHER PUBLICATIONS

Ringer et al., "Autohighlight: Highlight detection in League of Legends esports broadcasts via crowd-sourced data"; Machine Learning with Applications vol. 9, Sep. 15, 2022, 100338; Received May 11, 2021, Revised May 16, 2022, Accepted May 16, 2022, Available online May 24, 2022, Version of Record Jun. 3, 2022; retrieved on [25.07.2023], retrieved from the Internet <URL:https://www.sciencedirect.com/science/article/pii/S2666827022000469/pdfft?md 5=e299d21da3f58334blac337724626d 02&pid =1-s2 . 0-S2666827022000469-main. pdf> entire document.

* cited by examiner

CROWD-SOURCED ESPORTS STREAM PRODUCTION

BACKGROUND OF THE INVENTION

1. Field of the Disclosure

Aspects of the subject technology relate to crowd-sourcing stream production in esports events, and in particular, to utilizing vantage points from a plurality of spectators and selecting at least one media capture from spectator devices associated with the plurality of spectators.

2. Description of the Related Art

Interactive content—such as a video game—may be an electronic file executable to generate a virtual environment in which a player may interact with virtual characters and/or objects. The player may initiate and control such interaction using a user interface coupled to a computing device, which may respond to such interaction by generating audiovisual, haptic, and other feedback via an entertainment system, which may include a gaming console, a television screen, computer monitor, and sound system or audio system. The user interface may include, for example, an arcade joystick, a video game console controller, a computer keyboard, a computer mouse, a touchscreen display, cameras, sensors, etc.

Some video games may feature competitive or cooperative multi-player gameplay, thereby allowing multiple players—who may include both local and remote players—to play the same game simultaneously (e.g., during the same interactive session) in the same virtual environment. Certain competitions may be played tournament-style, in which a series of "esports" competitions are held among individual players or team of players.

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Before the Internet, video game fans could watch a video game player play by being in the physical vicinity of the video game player and physically watching the video game player and the screen, such as at a friend's house, at an arcade, or at a video game competition. More recently, some video games with network connectivity have been developed with an integrated "spectator" functionality in the game's code or at the platform level, allowing users to watch an online stream of live gameplay without actually playing or influencing the outcome of the game. For example, video streaming services such as Twitch® allow a video game player to broadcast a video content stream of their live gameplay to subscribing spectators (via their respective spectator devices) over the Internet.

With the advent of massive multiplayer online games, however, virtual environments or virtual universes have expanded exponentially in size and complexity beyond traditional arcade games. While many traditional arcade games merely present one or a few points of view corresponding to a respective player, massive multiplayer online games may have as many points of view and vantage points as there are players or other users (e.g., spectators), which may number in the millions. As such, the number of possible views may be overwhelming to a new or inexperienced spectator, who is unable to curate or otherwise control their spectating experience effectively. As such, the new or inexperienced spectator may not be as engaged as they may otherwise be if they were to be presented with vantage points and views of the virtual environment in accordance with their preferences. While the spectator may opt to follow a more experienced curator or commentator, such solutions may only partially meet their particular preferences.

Thus, there is a need in the art for improved systems and methods of crowd-sourced esports stream production.

DETAILED DESCRIPTION

In the same way that many sports fans enjoy watching sports games involving professional or amateur sports players both to learn sports techniques and to share a sense of community, many video game fans enjoy watching professional or amateur video game players both to learn video game techniques and to share a similar sense of community. Competitive gaming, sometimes referred to as electronic sports or "esports," involves the play of video games in a competitive environment comparable to traditional sports.

During competitive gaming involving single-player games, players sometimes compete to achieve a high score, or to achieve a particular goal within the video game in a record time, sometimes referred to as a "speed run." During competitive gaming involving multi-player games, players sometimes likewise compete for best scores or times, but are also sometimes ranked against each other based on numbers of wins and/or losses against one another, or other statistics, often based on multiple game "matches" spread out over time, sometimes in a tournament style.

Competitive gaming includes localized video game competitions that take place in a particular physical location, in which case spectators may be in the physical vicinity of the players. Competitive gaming also includes virtual video game competitions with a more virtual organization structure conducted online, where gameplay footage may be distributed to spectators via a network connection via video stream. Due to increasing popularity of the competitive gaming community, competition providers such as Major League Gaming (MLG) have more recently endeavored to provide an increased level of organization and structure to video game competitions for a number of video games, especially at the professional level.

The subject technology described herein enhances and expands the functionality of server(s) that provide gameplay information to video game spectators and of user devices corresponding to spectators. The servers may be associated with a video game, a video game platform/console, a video game league, or a combination thereof. The server(s) monitor timers and/or in-game events to identify that a trigger event has occurred, and in response, the server(s) may provide production tools for crowd-sourced esports streams. For example, the server(s) can determine perspectives that user devices are spectating the trigger event from and stream one or more of the perspectives to one or more user devices.

Figure 1:
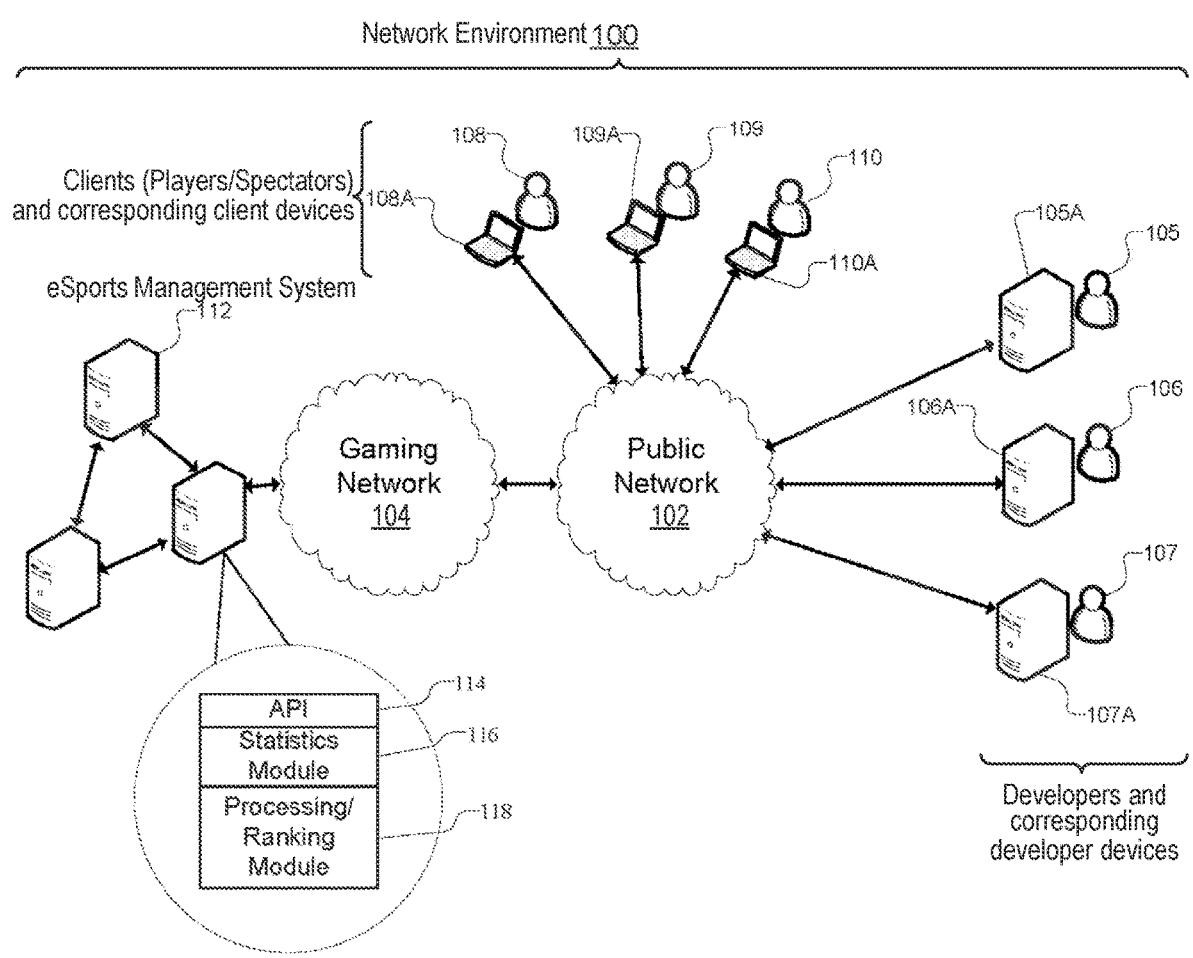
FIG. 1 illustrates an example of a network environment in which some aspects of the technology can be implemented.

FIG. 1 illustrates an example of network environment in which some aspects of the technology can be implemented. Network environment 100 includes public network 102, which can include one or more private networks, such as a local area network (LAN), a wireless local area network (WLAN), a wide area network (WAN), or a network of public/private networks, such as the Internet. Public network 102 is communicatively coupled to gaming network server 104, which may for example represent multiple servers, associated routers, and other network hardware 220 supporting online gameplay for a particular type of client computing device, such as a particular brand of video game console. The gaming network server 104 may be inclusive of a variety of servers and other network hardware/resources configured for implementing an esports management system 112. The esports management system 112 may also optionally operate on other gaming network servers 104 for interoperability of gaming leagues between different gaming network servers 104 and therefore different types of client computing devices 210. The esports management system 112 may include a number of servers and/or routers associated with operation and maintenance of network-based gameplay for particular video games, a particular video game platform/console, a video game league, or a combination thereof. For example, the esports management system 112 can generate a virtual esports environment for a particular video game, a particular video game platform/console, a video game league, or a combination thereof. The servers, routers, and other hardware used in esports management system 112, gaming network server 104, and public network 102 may be computer systems 400 as illustrated in and discussed with respect to FIG. 4, or may include components of the computer systems 400. The esports management system 112 can record the game state information to allow spectators to rewind and watch a replay of game play action. Such a replay can be from existing viewing angles, or the spectator can adjust the viewing angle to get a better view of action that happened. In some cases, the system can automatically generate replay renderings of exciting action and make that easily accessible to spectators, which may be in the form of one or more streams that show renderings of the most exciting action that happened.

Public network 102, and gaming network server 104 provide client and developer access to esports management system 112. As illustrated, clients 108, 109, and 110 are permitted access to esports management system 112 using respective client devices (e.g., 108A, 109A, and 110A). Clients, and their respective devices, may take on a player role or a spectator role at any given time in a given video game match. Although client devices 108A, 109A, and 110A, are depicted as personal computing devices, it is understood that the client devices can include various types of processor-based systems, including but not limited to: game consoles, smart phones, tablet computer systems, and the like. Example of hardware systems that can be used to implement the client device are illustrated in and discussed in further detail below with respect to FIG. 2 and FIG. 4. Similarly, developers (e.g., 105, 106 and 107), are permitted access to league management system via respective their computing systems (e.g., 105A, 106A, and 107A). Developer computing systems may likewise be computer systems 400 as illustrated in and discussed with respect to FIG. 4, or may include components of the computer systems 400.

It is further contemplated that a client device (e.g., 108A, 109A, and 110A) can include one or more displays. For example, a client device associated with a spectator device (e.g., a spectator device) can include a primary display that is operable to display selected media captures as discussed further below. It is also considered that these devices can include secondary displays that can be used to augment or otherwise provide additional media captures, information, and/or entertainment to spectators.

It is understood that a greater or smaller number of clients and/or developers can be engaged with environment 100 than are illustrated in FIG. 1 and described herein, without departing from the scope of the technology.

Some video games, especially those with online multi-player capabilities, allow spectators to watch gameplay without actually playing or influencing the outcome of the game in any way. The spectator functionality is typically developed by developers (e.g., 105, 106 and 107) with an integrated "spectator" functionality. The integrated "spectator" functionality may be integrated into code of the particular video game that runs during gameplay and/or into online servers that help operate the particular video game's online multiplayer functionality. A spectator client using such an integrated spectator function generally has a copy of the video game whose gameplay he/she is spectating on his/her corresponding client device, allowing the spectator client device to render the gameplay in the same way or in a similar way that client computing devices of player clients render the gameplay, only without giving the spectator any opportunity to control the gameplay via the spectator's client computing device.

This type of game-integrated spectating technology has the benefit of being more efficient in terms of network bandwidth usage than spectating via streaming of video content, as online games are typically optimized to use as little bandwidth as possible to maintain an acceptable gameplay speed for all players and spectators. The online games accomplish this by transmitting instructions as to how to render a shared virtual space, and then how to render modifications/updates to that shared virtual space over the course of gameplay over a time period between a beginning and an end of a game match. While the initial rendering of the shared virtual space may be complex—for instance, the game and/or game's servers may instruct player and spectator client devices to render numerous character avatars, pieces of scenery, landscapes, buildings, and so forth—later updates/modifications to the shared virtual space are generally less complex. For instance, for an update/modification during gameplay in the example of the preceding sentence, the game and/or game's servers may instruct player and spectator client devices to render that one of the character avatars has moved forward slightly while everything else previously rendered has remained static.

Spectating can occur via online video streaming, which allows spectators (via their spectator devices) to stream video content of recorded or live gameplay, either in real-time or with a slight delay. In reference to FIG. 1, the gameplay video may be captured or recorded at player client devices (108A/109A/110A) and sent to spectator client devices (108A/109A/110A), optionally via networks 102/104/112 or similar video-streaming-focused networks not illustrated in FIG. 1. Video streaming allows, for example, video games that do not have integrated spectator functionality to be spectated, for instance allowing spectators to watch a player play an older or legacy game title, an emulated game, or a game that otherwise has no online connectivity, as well as allowing a wide variety of computing devices to be used to spectate, regardless of processing capability or compatibility with the game title. That is, a spectator can spectate a player playing a graphically intensive game from their phone or another device that would not otherwise have the processing capabilities to render the gameplay of the graphically intensive game, and/or that is running an operating system that is not compatible with the graphically intensive game.

Integrated spectating technology may be provided by the game title itself, as well as associated platforms, service providers, and/or devices, including client device (such as a particular brand of video game console/platform), the gaming network server 104, and/or an esports management system 112. That is, client computing devices 108A/109A/110A of a particular type—such as video game consoles of a particular brand—may include this integrated spectating technology, as well as the gaming network server 104 associated with client computing devices 210 of that particular type. Alternately or additionally, client computing devices 210 that are optionally of different types may all be compatible with an esports management system 112 that includes servers 112 and/or software running on the client computing devices 210.

The particular type of client device (such as a particular brand of video game console/platform), the gaming network server 104, and/or an esports management system 112 may include application programming interfaces (APIs) associated with spectating video games. In FIG. 1, for instance, the esports management system 112 is illustrated as having an API 114, though the APIs discussed herein may alternately or additionally be implemented in the gaming network server 104 and/or the client computing devices 210. An individual video game and/or servers associated with the individual video game can then call spectator functions coded into such an API during gameplay to invoke spectator functionality. The spectator function may be standardized across that type of client device 210, that gaming network server 104, and/or that esports management system 112. In this way, a spectator client device having access to the gaming network server 104 may further access the esports management system 112, or a combination thereof, to access esports-related streams and related content and services.

Because the video game data may be in a standardized format using the API 114 or a gaming network server 104 API (or other type of data file), as long as the spectator client device can operate with the esports management system 112 or gaming network server 104, spectator client device can spectate the game. For example, a client computing device running an operating system that is incompatible with a particular video game but that is compatible with the esports management system 112 or gaming network server 104 may still be able to spectate a game match of that otherwise incompatible video game. Game-integrated, console/platform-integrated, network-integrated, and/or league-integrated spectating technologies may provide extended levels of control for spectators because information about the entire shared virtual space is sent to the spectator, not just what a particular player sees, before the game content is rendered at the spectator's computing device. The spectator can be given an increased control over their view of the gameplay, allowing the spectator to pan, zoom, or rotate their perspective. A spectator may also emulate different viewing perspectives of different players currently playing the game, in series or in parallel. In this way, in a game with multiple players in the same shared virtual environment, a spectator may be able to view more than any individual player can, for example by repeatedly changing their view of the shared virtual space. As such, each spectator may generate unique perspectives and/or vantage points of various virtual assets (e.g., a goal, a player avatar, a virtual building structure, etc.). In some embodiments, the vantage points are rendered by the esports management system 112 and streamed to the spectator. In other embodiments, the vantage points are rendered by a spectator device (e.g., a client computing device 108A/109A/110A) and provided as data to esports management system 112 (e.g., via public network 102 and/or gaming network server 104).

Game-integrated, console/platform-integrated, network-integrated, and/or league-integrated spectating technologies also allow additional ways for players and spectators to interact with the shared virtual environment and with each other. For example, integrated spectating technologies allow two client devices to interact as illustrated in and discussed with respect to FIG. 3. In some games, spectators may be able to provide their own media capture, perspective, and/or vantage point of the game to other devices (e.g., spectator devices, client devices, player devices, broadcasting devices, etc.), as illustrated in and discussed with respect to FIG. 3.

To utilize these various vantage points or perspectives, esports management system 112 is configured to receive captured media from each spectator device (e.g., across public network 102 and/or in communication with one or more gaming network servers 104). For example, esports management system 112 can receive images or views of a certain player, scene, or in-game event that one or more spectator devices may be viewing. Additionally, esports management system 112 is configured to provide streams of the virtual environment from one or more different perspectives to requesting devices. For example, one spectator may want to access a stream where the perspective is controlled by another spectator, who may be selecting from among different virtual locations within the virtual environment (where different characters or objects may be located), vantage points (at different distances, heights, and angles), zoom levels, specialized visual settings, overlays, etc. Accordingly, esports management system 112 can stream or otherwise provide the perspective of one spectator to one or more other spectators. As a result, a plurality of spectators are able to share the same perspective, thereby allowing the spectators to view the same in-game events in the same way. For example, if one spectator is dynamically controlling a streamed view of a player such that their perspective is circling around the player, the other spectators can access the same stream to view the player in the same circling fashion as the controlling spectator. It is further contemplated that esports management system 112 can be configured to associate different badge levels with one or more spectators. The badge levels can distinguish or otherwise assist in identifying a particular spectator. The badge levels can be based on quantity of views shared, quantity of streams viewed by other spectators, specialization in a certain perspective view, etc.

In other words, esports management system 112 can monitor or otherwise access streams captured from a variety of different vantage points associated with different players or spectators. Additionally, esports management system 112 can select from among the different media captures in each stream, as well switch from stream to stream or combine multiple streams into a single display. Selection of the media captures, perspectives, and/or vantage points can be based on a wide variety of different factors including, but not limited to, visibility of an asset in the virtual environment, proximity to or clustering of other spectator perspectives, an identity or title of the spectator (e.g., if the spectator is a prominent player, a professional broadcaster, etc.).

In some embodiments, automated selection of the media captures can also be based on a preference set by individual requesting spectators. The esports management system 112 may also use express or indicated preferences of a spectator in curating from multiple source streams and generating a combination stream specifically for that spectator. Where the spectator may express certain default preferences, for example, esports management system 112 can provide a stream of media captures selected in accordance with such preferences to the spectator device as a primary or default stream. For example, a requesting spectator may desire to view a favorite player rather than a specific goal. Accordingly, esports management system 112 can select media captures from the favorite player's point-of-view, from one of the other players within viewing distance, or from one of the spectators whose virtual camera is directed to the favorite player. As another example, a requesting spectator may desire to view a specific in-game structure from a ground level rather than from an upper perspective (e.g., bird's eye view). Accordingly, esports management system 112 can allow for automated filtering of different stream views, as well as selection of a media capture from one of the filtered views that captures the specific player and structure from the desired perspective. The media captures can also include views other than renderings of the game environment such as score boards or maps. Media captures can also include information that is not available to one or more players. For example, a scoreboard may display the health and inventory level of multiple players when players in the game may only be able to see some of the details about themselves or teammates, but not for other players. As another example, a map shown to a spectator may include information, such as location of enemies or traps, that is not visible to a player when viewing the map. A game rendering for a spectator may include features that are not used in game renderings seen by players, such as having accessibility features turned on (e.g., high contrast or object highlighting).

It is further contemplated that esports management system 112 can record statistics for each respective stream(s) and associated curators or producers. For example, esports management system 112 can record viewership statistics (e.g., how many other spectators subscribe, follow, or otherwise request access to a specific stream), viewer interaction with each other and the curator, team or player affiliation, similarity (e.g., in distance and/or angle) of vantage point, etc. In some embodiments, esports management system 112 can generate a notification to spectator devices based on a match between respective statistics for each spectator device, such that the notification includes a selectable option to initiate a chat communication function between the matched spectator devices. In some embodiments, esports management system 112 can, in response to affirmations by the spectator devices, enable microphones and/or other sensors to enable text, audio, or video chat communication between the matched spectator devices. For example, spectators using a similar vantage point (e.g., a perspective within a threshold distance from another perspective, perspectives within a threshold distance from an object, perspectives having similar angles to an object, etc.) can be identified as matches and enable communication therebetween. By matching spectators with similar vantage points together and enabling communication between the matched spectators, a sense of community, camaraderie, and/or mutual enjoyment of similar interests can replicate some of the same feelings as those in a physical arena when fans interact with each other. In some embodiments, audio from spectator microphones is introduced into the game environment as crowd noise originating from the points in which the corresponding game renderings being viewed by the spectators originate from. These crowd noise audio sources may also be directional based on the direction that the view for the game rendering is facing. This may provide a rendering of sounds from other spectators, much like in the real world where the closer a spectator moves to another spectator the better the other spectators can be heard; and the further away the spectator moves the less the spectator can hear the other spectators. There can also be controls for the level of crowd noise that is included in the audio that is heard, both for players and for spectators. The inclusion of such crowd noise can give a more energetic live feel to game play that is being spectated.

It is further contemplated that these spectator views can be utilized on a secondary display of spectating devices. For example, a first spectator may be utilizing their own perspective or vantage point on a primary display and simultaneously request another view (e.g., a perspective from a second spectator) to display on a secondary display. Thus, the first spectator would be able to simultaneously view the game from more than one perspective (i.e., his/her own view and a perspective of another spectator). It is also considered that the secondary display can be used to display available media captures, views for selection (e.g., to display on the secondary display, switch views to the primary display, etc.), concurrent displays of opponents, etc. In some embodiments, for example, a grid can be generated to provide a menu of different view options available for a given scene, whereby a spectator can switch a display on a primary screen to switch out or add one or more selected views. A grid display may also be used to present multiple display areas that can be customized to provide various session information and/or entertainment (e.g., player profiles, scores, game or tournament records, different views or perspectives, replays, highlights, etc.) based on a context in the primary display. For example, when a player performs a difficult or otherwise significant maneuver, the grid can display the player profile, a replay of the player performing the difficult maneuver, highlights of one or more players performing the difficult maneuver, explanations about why the maneuver is difficult or impressive, narrative context for the maneuver being performed within a storyline of the interactive title, etc. It is further contemplated that the grid can be configured with preference rules for automatic view switching. For example, a spectator may be new to the game and have a preference for learning more about the game. Thus, the grid may provide additional information about why maneuvers are difficult, why players perform certain actions at specific locations or times, instructions for performing a maneuver recently displayed, additional clips of other players performing similar actions, etc. As another example, the automatic view switching can also assist in providing content that is important to the game to spectators that are new to the game. For example, spectators that are new to the game may not understand what or where to look. Thus, the preference rule for automatic view switching can have a new player preference that automatically switches to perspectives that captures aspects of the game that is important to the objectives of the game. For example, in many multiplayer online battle arena games, the goal is typically to destroy the enemy base. However, there are various goals that must be completed before it is possible to destroy the enemy base (e.g., destroying enemy towers outside of the base). Accordingly, esports management system 112 can receive the new player preference for automatic view switching to automatically provide perspectives to the device associated with the spectator, such that the provided perspectives show the current goal of interest (e.g., a tower being destroyed, a portion of the base being destroyed, etc.). It is further contemplated that a spectator may be able to view one or more game renderings that are generated locally while also viewing one or more game renderings that are being streamed over a network. Additionally, the local system may display annotations over a game rendering, whether generated locally or streamed, that are customized to provide information of interest to the spectator, such as game rules or player statistics.

Figure 2:
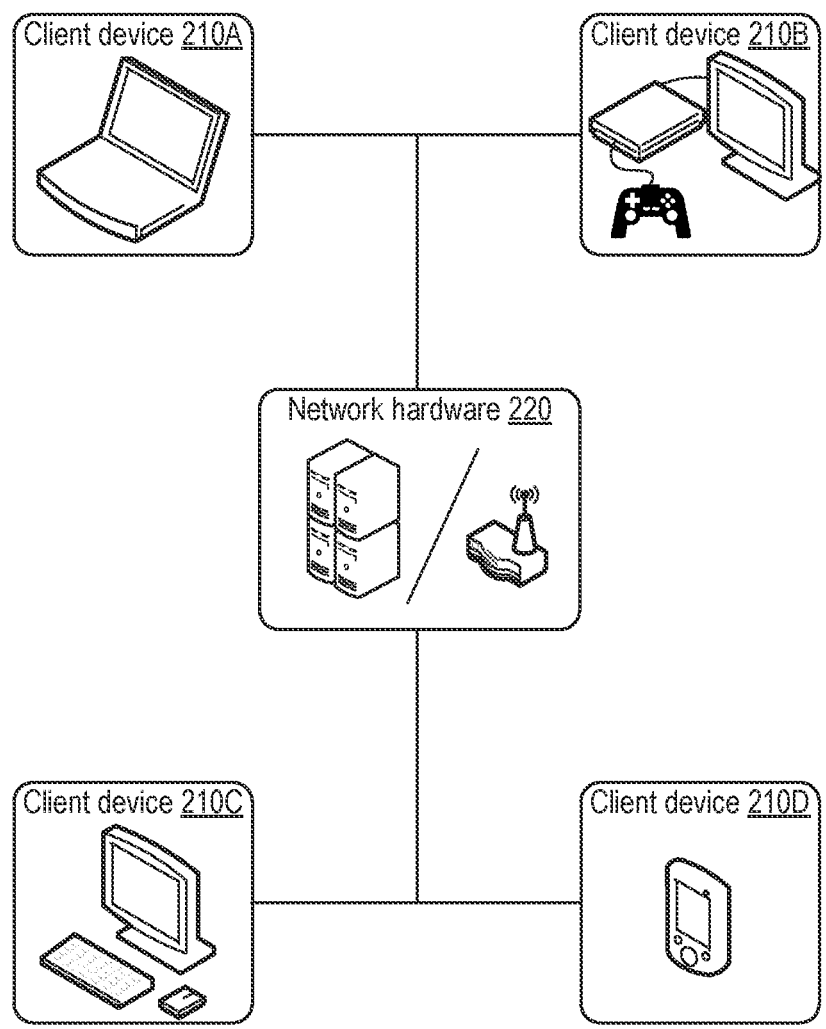
FIG. 2 illustrates a network-based video game environment involving different types of client computing devices.

FIG. 2 illustrates a network-based video game environment involving different types of client computing devices. The network environment 100 of FIG. 1 may be implemented using different types of client computing devices 210, each of which represent computer systems 400 or at least include components as being part of the computer system 400 of FIG. 4.

For instance, FIG. 2 illustrates a first client computing device 210A that is a laptop portable computer, a second client computing device 210B that is a home video game console connected to a television, a third client computing device 210C that is a desktop home computer, and a fourth client computing device 210D that is a smartphone/tablet portable computing device and/or a portable video game console. Any of the client computing devices 210 of FIG. 2 may be assigned player roles or spectator roles for a particular game. In the context of the environment 100 of FIG. 1, each of the client computing devices 108A, 109A, and 110A of FIG. 1 are client computing devices 210.

All four of the client computing devices 210 of FIG. 2 are communicatively coupled together via network hardware 220, which in the context of the environment 100 of FIG. 1, may include various servers, routers, and other network hardware within one or more esports management system(s) 112, one or more gaming network(s) 104, the public network 102, or a combination thereof.

Figure 3:
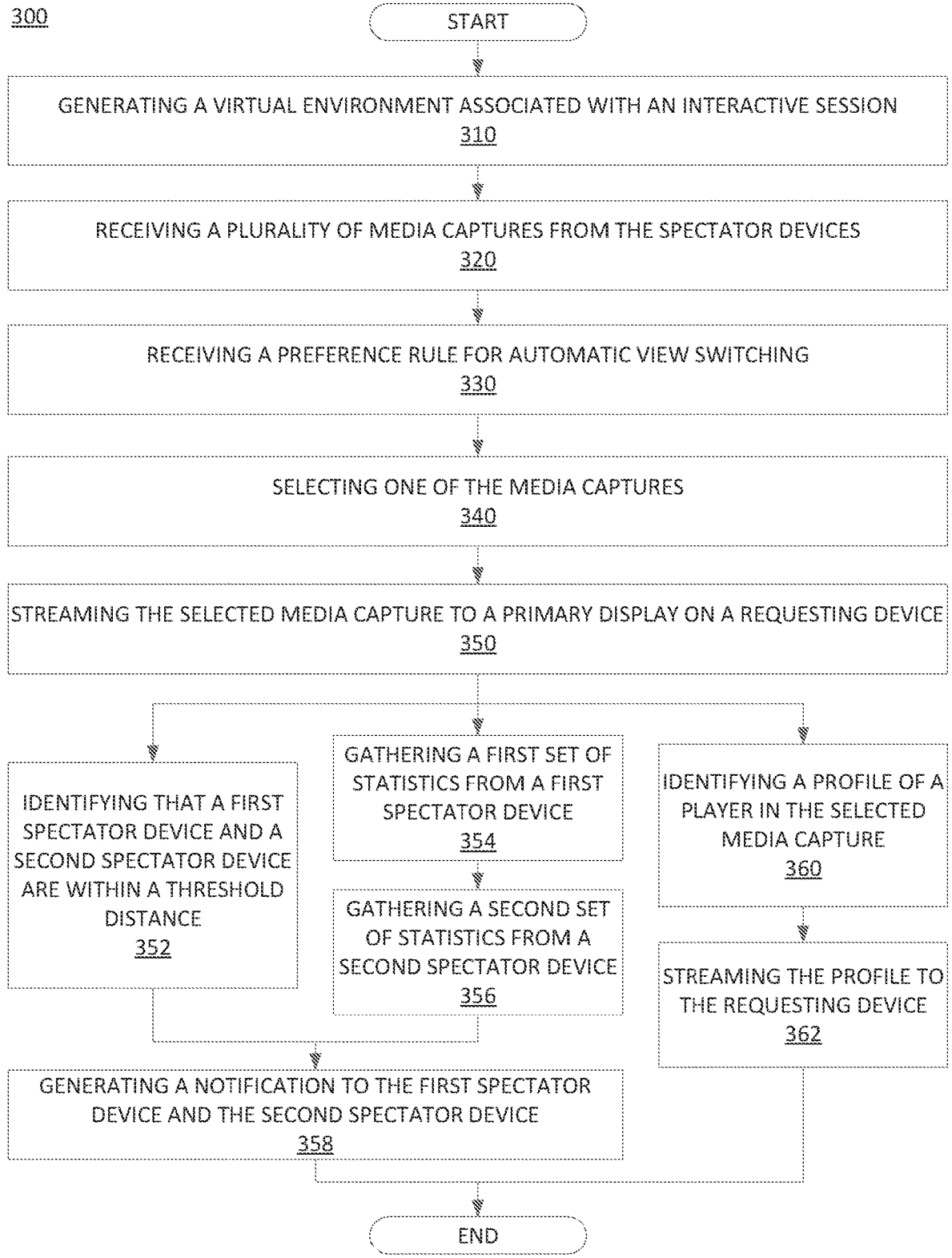
FIG. 3 illustrates a flow diagram illustrating server network operations for producing crowd-sourced esports streams.

FIG. 3 illustrates a flow diagram illustrating server network operations for crowd-sourcing esports stream productions. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

At step 310, a game server (e.g., esports management system 112) can generate a virtual environment associated with an interactive session. The interactive session can include a plurality of spectator devices. Each spectator device can be presented with a different display based on a corresponding vantage point located within the virtual environment. As discussed above, each spectator device can control the corresponding vantage point to move around and observe virtual objects within the virtual environment.

At step 320, a game server (e.g., esports management system 112) receives a plurality of media captures (e.g., images, videos, clips, livestreams, audio content, audiovisual content, etc.) from the spectator devices. Each of the media captures can be captured from the respective vantage point of the spectator device within the virtual environment.

At step 330, a game server (e.g., esports management system 112) can receive a preference rule for automatic view switching. The preference rule can define when a display (e.g., a secondary display, a display grid, etc.) associated with a requesting device switches between the plurality of media captures (e.g., other perspectives or different views, replays, highlights, etc.), information (e.g., player profiles, virtual asset information, strategy, etc.), and/or other entertainment. In some embodiments, the requesting device can be configured with one or more displays (e.g., a primary display, a secondary display, etc.) that are configured to display one or more media captures on any of the one or more displays.

At step 340, a game server (e.g., esports management system 112) selects one of the media captures. In some embodiments, the game server can select media captures based on a wide variety of factors including, but not limited to, visibility of an asset in the virtual environment, an angle of the perspective to the asset, a distance to the asset, clustering of spectator perspectives (e.g., a large number of spectators are spectating from a similar or the same vantage point), etc. In some embodiments, a plurality (e.g., two or more) of the media captures are selected. In some embodiments, the game server selects media capture(s) based on the preference rule.

At step 350, a game server (e.g., esports management system 112) streams the selected media capture to a primary display on a requesting device. In some embodiments, the game server can stream two or more media captures, such that the two or more media captures are displayed on one or more of the primary display and a secondary display associated with the requesting device.

At step 352, a game server (e.g., esports management system 112) can identify that a first spectator device and a second spectator device are within a threshold distance. It is also contemplated that the game server can identify, additionally or alternatively, that the first spectator device and the second spectator device are viewing a virtual asset from an angle within a threshold tolerance, such that the first spectator device and the second spectator device are viewing the virtual asset from a substantially similar direction.

Additionally or alternatively, at step 354, a game server (e.g., esports management system 112) gathers a first set of statistics from a first spectator device. For example, esports management system 112 can gather, for and/or from the first spectator device, viewership statistics (e.g., how many other spectators tune-into a specific spectator view), team or player affiliation, similarity (e.g., in distance and/or angle) of vantage point, etc.

At step 356, a game server (e.g., esports management system 112) gathers a second set of statistics from a second spectator device. For example, esports management system 112 can gather, for and/or from the second spectator device, viewership statistics (e.g., how many other spectators tune-into a specific spectator view), team or player affiliation, similarity (e.g., in distance and/or angle) of vantage point, etc.

At step 358, a game server (e.g., esports management system 112) generates a notification to the first spectator device and the second spectator device. In some embodiments, the notification can be generated based on the identification that the first spectator device and the second spectator device are within a threshold distance, as described in step 352. In some embodiments, the notification can be generated based on a match between the first set of statistics and the second set of statistics. In some embodiments, the notification includes a selectable option to initiate a chat communication function between the first spectator device and the second spectator device.

Additionally or alternatively, at step 360, a game server (e.g., esports management system 112) identifies a profile of a player in the selected media capture. For example, a player may be shown to be performing a specific action in the selected perspective. Accordingly, esports management system 112 can identify a profile (e.g., in a database of player profiles) associated with the player performing the specific action.

At step 362, a game server (e.g., esports management system 112) streams the profile to the requesting device. In some embodiments, the profile is displayed on a secondary display. In some embodiments, the profile is displayed in at least one portion of a grid on a display of the requesting device.

Figure 4:
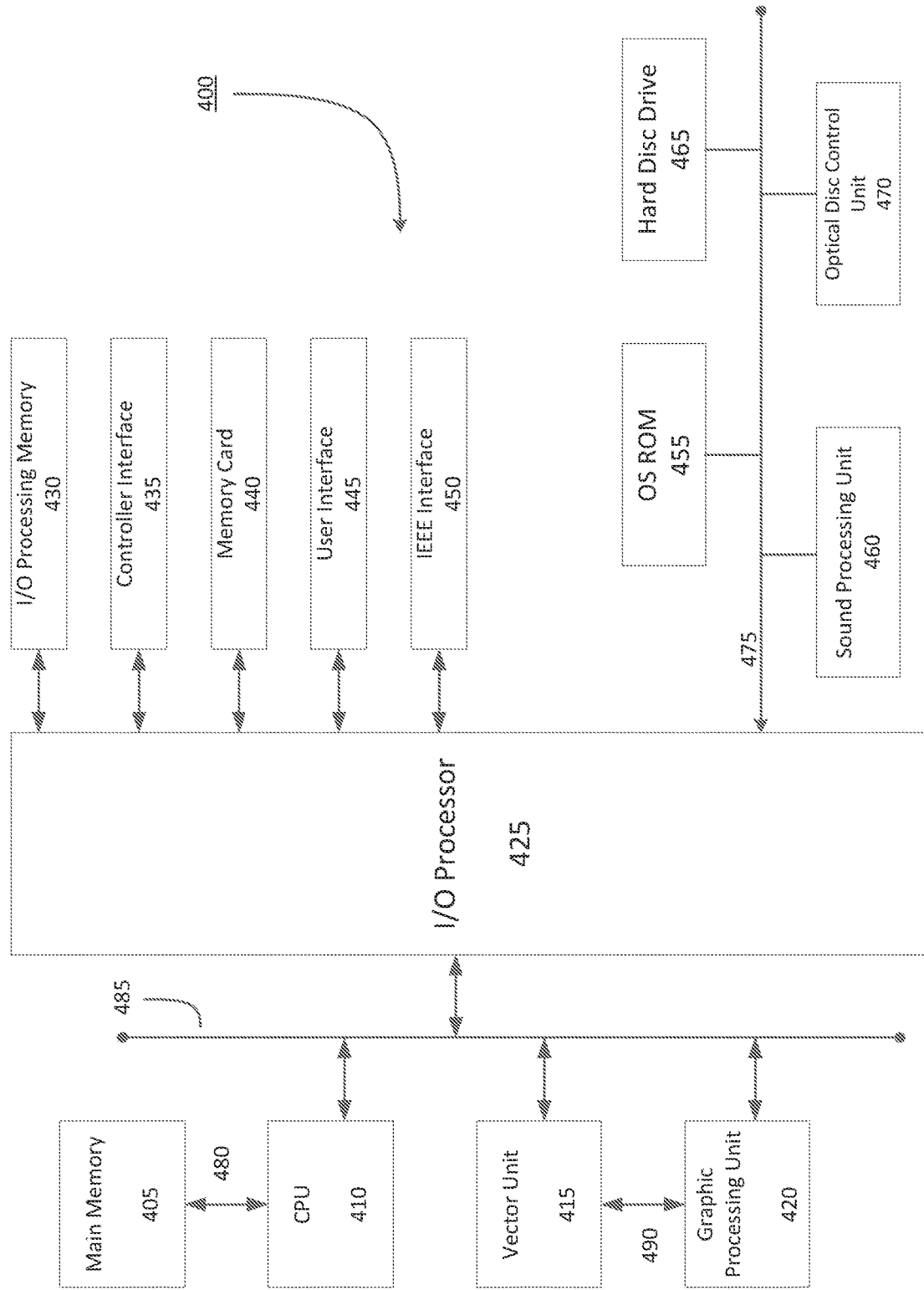
FIG. 4 is a block diagram of an exemplary computing device that may be used to implement some aspects of the subject technology.

FIG. 4 is a block diagram of an exemplary electronic entertainment system 400. The entertainment system 400 of FIG. 4 includes a main memory 405, a central processing unit (CPU) 410, vector unit 415, a graphics processing unit 420, an input/output (I/O) processor 425, an I/O processor memory 430, a controller interface 435, a memory card 440, a Universal Serial Bus (USB) interface 445, and an IEEE interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4$, LTE, 3G, and so forth). The I/O processor 425 of FIG. 4 primarily controls data exchanges between the various devices of the entertainment system 400 including the CPU 410, the vector unit 415, the graphics processing unit 420, and the controller interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the IEEE 1394 interface 450 such as wireless transceivers, which may also be embedded in the system 400 or as a part of some other component such as a processor.

A user of the entertainment system 400 of FIG. 4 provides instructions via the controller interface 435 to the CPU 410. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method for crowd-sourcing content for esports stream production, the method comprising:
   generating a virtual environment associated with an interactive session that includes a plurality of spectator devices, wherein each of the spectator devices is presented with a different display based on a corresponding vantage point located within the virtual environment;
   receiving a plurality of media captures from the spectator devices, wherein each of the media captures is captured from the corresponding vantage point associated with the spectator device within the virtual environment;

selecting one of the media captures based on a comparison of visibility of an asset in the virtual environment; and streaming the selected media capture to a requesting device, wherein the streamed media capture is displayed on a primary display of the requesting device.

2. The computer-implemented method of claim 1, wherein the requesting device is configured to display a set of the media captures on a secondary display.

3. The computer-implemented method of claim 1, further comprising:
identifying that a first spectator device and a second spectator device are within a threshold distance; and
generating a notification to the first spectator device and the second spectator device based on the identification, wherein the notification includes a selectable option to initiate a chat communication function between the first spectator device and the second spectator device.

4. The computer-implemented method of claim 1, further comprising:
gathering a first set of statistics associated with a first spectator device;
gathering a second set of statistics associated with a second spectator device; and
generating a notification to the first spectator device and the second spectator device based on a match between the first set of statistics and the second set of statistics, wherein the notification includes a selectable option to initiate a chat communication function between the first spectator device and the second spectator device.

5. The computer-implemented method of claim of claim 1, further comprising:
identifying a profile of a player in the selected media capture; and
providing the profile to the requesting device.

6. The computer-implemented method of claim of claim 1, wherein two or more of the media captures are selected and streamed to the requesting device, and wherein each of the two or more media captures is displayed on one or more of the primary display and a secondary display associated with the requesting device.

7. The computer-implemented method of claim 1, further comprising:
receiving a preference rule for automatic view switching for the requesting device; and
storing the preference rule in memory, wherein selecting the media capture is further based on the preference rule.

8. The computer-implemented method of claim 7, wherein the preference rule defines one or more conditions for switching among the plurality of media captures displayed on a secondary display associated with the requesting device.

9. The computer-implemented method of claim 1, further comprising customizing a display of the plurality of media captures for presentation on a secondary display based on the asset in the selected media capture.

10. A system for crowd-sourcing content for esports stream production, the system comprising:
a processor that executes instructions stored in memory, wherein the processor executes the instructions to generate a virtual environment associated with an interactive session that includes a plurality of spectator devices, wherein each of the spectator devices is presented with a different display based on a corresponding vantage point located within the virtual environment;
a communication interface that communicates over a communication network, wherein the communication interface receives a plurality of media captures from the spectator devices, wherein each of the media captures is captured from the corresponding vantage point associated with the spectator device within the virtual environment;
wherein the processor executes further instructions to select one of the media captures based on a comparison of visibility of an asset in the virtual environment; and
wherein the communication interface streams the selected media capture to a requesting device, and wherein the streamed media capture is displayed on a primary display of the requesting device.

11. The system of claim 10, wherein the requesting device is configured to display a set of the media captures on a secondary display.

12. The system of claim 10, wherein the processor executes further instructions to:
identify that a first spectator device and a second spectator device are within a threshold distance; and
generate a notification to the first spectator device and the second spectator device based on the identification, wherein the notification includes a selectable option to initiate a chat communication function between the first spectator device and the second spectator device.

13. The system of claim 10, wherein the processor executes further instructions to:
gather a first set of statistics associated with a first spectator device;
gather a second set of statistics associated with a second spectator device; and
generate a notification to the first spectator device and the second spectator device based on a match between the first set of statistics and the second set of statistics, wherein the notification includes a selectable option to initiate a chat communication function between the first spectator device and the second spectator device.

14. The system of claim 10, wherein the processor executes further instructions to identify a profile of a player in the selected media capture; and wherein the communication interface provides the profile to the requesting device.

15. The system of claim 10, wherein two or more of the media captures are selected and streamed to the requesting device, and wherein each of the two or more media captures is displayed on one or more of the primary display and a secondary display associated with the requesting device.

16. The system of claim 10, wherein the communication interface further receives a preference rule for automatic view switching for the requesting device; and further comprising memory that stores the preference rule, wherein selecting the media capture is further based on the preference rule.

17. The system of claim 16, wherein the preference rule defines one or more conditions for switching among the plurality of media captures displayed on a secondary display associated with the requesting device.

18. The system of claim 10, wherein the processor executes further instructions to customize a display of the plurality of media captures for presentation on a secondary display based on the asset in the selected media capture.

19. A non-transitory, computer-readable storage medium, having embodied thereon a program executable by a processor to perform a method for crowd-sourcing content for esports stream production, the method comprising:
generating a virtual environment associated with an interactive session that includes a plurality of spectator devices, wherein each of the spectator devices is presented with a different display based on a corresponding vantage point located within the virtual environment;

receiving a plurality of media captures from the spectator devices, wherein each of the media captures is captured from the corresponding vantage point associated with the spectator device within the virtual environment;

selecting one of the media captures based on a comparison of visibility of an asset in the virtual environment; and streaming the selected media capture to a requesting device, wherein the streamed media capture is displayed on a primary display of the requesting device.

* * * * *